United States Patent [19]

Quarato

[11] Patent Number: 5,586,236
[45] Date of Patent: Dec. 17, 1996

[54] UNIVERSAL COLOR LOOK UP TABLE AND METHOD OF GENERATION

[75] Inventor: James A. Quarato, Sunnyvale, Calif.

[73] Assignee: Object Technology Licensing Corp., Cupertino, Calif.

[21] Appl. No.: 104,839

[22] Filed: Aug. 11, 1993

[51] Int. Cl.$^6$ ........................................................... G06T 1/00
[52] U.S. Cl. .............................. 395/131; 345/199; 348/34
[58] Field of Search .............................. 395/131; 348/34; 345/199, 214

[56] References Cited

U.S. PATENT DOCUMENTS

| | | | |
|---|---|---|---|
| 4,394,688 | 7/1983 | Iida et al. | 348/28 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |

FOREIGN PATENT DOCUMENTS 0404398  12/1990  European Pat. Off. .

OTHER PUBLICATIONS

COMPUTER DESIGN, Jul./1982, pp. 123–130, Straayer "Hoisting the Color Standard").
Microsoft Windows User's Guide, 1992, pp. 144–146, 339–342, 356, 371, 372.

Primary Examiner—Heather R. Herndon
Assistant Examiner—Joseph H. Feild
Attorney, Agent, or Firm—Bookstein & Kudirka

[57] ABSTRACT

A system and method for managing the color palette for an object oriented operating system providing for the sharing of a plurality (e.g., 256) of colors for display by an external device. In a first aspect, an 8-bit color lookup table (CLUT) is shared by a plurality of views in a document being displayed on the external device such that consistent looking color is provided across a plurality of graphic devices. The inventive method includes creating a color look up table (CLUT) for the operating system, uniformly dividing the CLUT into a predetermined number of colors, displaying graphic information having a plurality of views, and sharing the predetermined number of colors in the CLUT amongst the plurality of views of the graphic information. The predetermined number of colors includes a plurality of colors each of which have a predetermined consistency when shared between first and second views of the plurality of views.

30 Claims, 7 Drawing Sheets

| MONITOR DEPTH BITS/PIXEL | MONOCHROME | COLOR |
|---|---|---|
| 1 | SUPPORTED | NA |
| 2 | SUPPORTED | NOT IMPLEMENTED |
| 4 | SUPPORTED | NOT IMPLEMENTED |
| 8 | SUPPORTED | SUPPORTED |
| 16 | SUPPORTED | SUPPORTED |
| 24 | SUPPORTED | SUPPORTED |
| 32 | SUPPORTED | SUPPORTED |

| INDEX | RED GUN | GREEN GUN | BLUE GUN |
|-------|---------|-----------|----------|
| 0 | 0 | 0 | 0 |
| 1 | 255 | 23 | 9 |
| • | • | • | • |
| • | • | • | • |
| • | • | • | • |
| 254 | 32 | 8 | 200 |
| 254 | 43 | 56 | 34 |

UNIVERSAL COLOR LOOK UP TABLE AND METHOD OF GENERATION

FIELD OF THE INVENTION

The present invention generally relates to color palette management for use in an operating system and more particularly to managing a color palette in an object oriented operating system.

BACKGROUND OF THE INVENTION

Object Oriented Programming (OOP) is the preferred environment for building user-friendly, intelligent computer software. Key elements of OOP are data encapsulation, inheritance and polymorphism. These elements may be used to generate a Graphical User Interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C. The key concept of C++ is class, which is a user-defined type. Classes provide object oriented programming features. C++ modules are compatible with C modules and can be linked freely so that existing C libraries may be used with C++ programs. The most widely used object based and object oriented programming languages trace their heritage to Simula developed in the 1960s by O-J. Dahl, B. Myhrhaug and K. Nygard of Norway. Further information on the subject of OOP may be had by reference to *Object Oriented Design with Applications* by Grady Booch, The Benjimin/Cummings Publishing Co., Inc., Redwood City, Calif. (1991).

With the brief overview of OOP above in mind, color palette management presents unique problems in the programming environment. Each pixel on a color monitor's surface includes a red phosphor, a green phosphor and a blue phosphor. Each phosphor has physical properties which determine the colors which the monitor may produce. The three phosphors and the maximum equal intensity of the electron beam guns determine a color gamut of the monitor. However, while the monitor's phosphors theoretically determine which colors the device may physically produce, there are practical limitations on the number of colors each monitor can produce. For example, since computers operate in a digital (as opposed to analog) realm, the number of colors which can be practically produced on a monitor is limited to a finite number. As the number of colors the monitor may produce increases, the memory for storing a digital image of the screen increases. The memory to store the screen is usually contained on a video card.

Due to memory costs, developers have traditionally dynamically set the desired portion of the monitor's color gamut for operation. This approach uses a Color Look Up Table (CLUT). Color palettes were selectively associated with either a window in an application or the application itself. A palette management system was developed in which colors could be requested by window or by the applications. Depending upon the type of request made, colors could be shared in a friendly or unfriendly fashion. When the active window or application was changed, the palette manger would make the transition between the old active palette and the new palette in a way as visually pleasing as possible to the user.

However, while it is relatively easy to associate the CLUT with an application or window in the conventional operating systems, the preferred operating system has problems with such an association.

SUMMARY OF THE INVENTION

It is therefore an object of the present invention to provide a new color palette management method and system in which views can share colors harmoniously and in a visually pleasing way and which is for use with an operating system which contains a compound document consisting of a number of encapsulators which are assembled into a larger document. The present invention associates a CLUT with a view and provides a different color sharing philosophy.

In a first aspect of the invention, a method of managing a color palette for an object oriented operating system, includes the steps of: creating a color look up table (CLUT) for the operating system; uniformly dividing the CLUT into a predetermined number of colors; displaying graphic information having a plurality of views; and sharing the predetermined number of colors in the CLUT amongst the plurality of views of the graphic information, wherein the predetermined number of colors includes a plurality of colors each of which have a predetermined consistency when shared between first and second views of the plurality of views.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
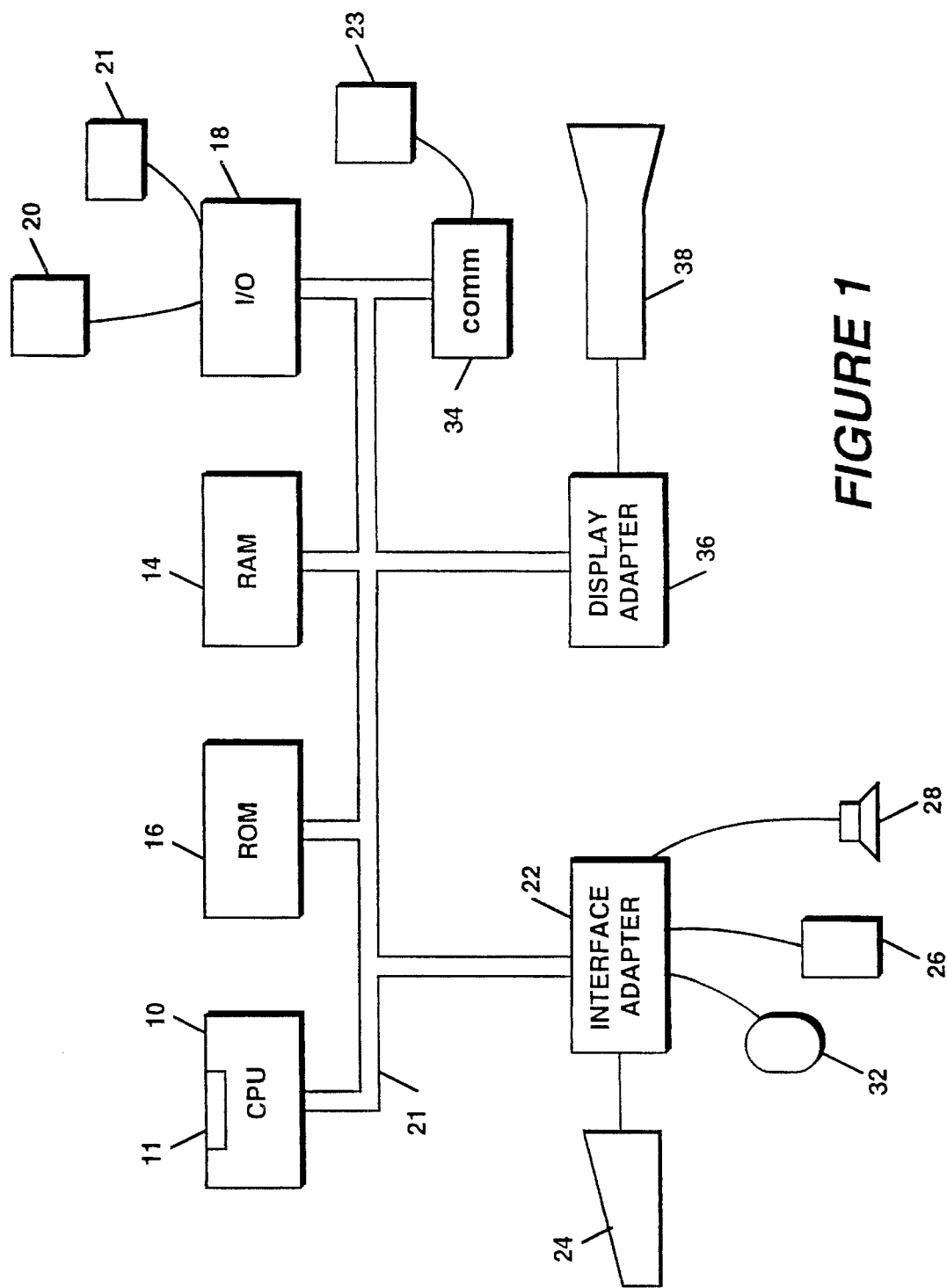
FIG. 1 is a block diagram of a computer system in accordance with a preferred embodiment.

The invention is preferably practiced in the context of an operating system resident on a personal computer such as the IBM ® PS/2 ® or Apple ® Macintosh ® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7 ® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and determines according to the component's variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs*, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphic, etc. Commercial examples of application frameworks are MacApp (Apple), Bedrock (Symantec), OWL (Borland), NeXTStep App Kit (NeXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using systems framework would be to have separate I/O frameworks for SCSI devices, NuBus cards, and graphic devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphic, multi-media, file systems, I/O, testing, etc. Application creation in the architecture of a preferred embodiment will essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. With the overview of OOP above in mind, color palette management presents unique problems in the programming environment. The use of color visualizations of images is discussed briefly below. Generally, a color space is a 3-dimensional representation which aids in the visualization of scalar components which define a color. The most prevalent color space used when describing colors on color monitors is the Red, Green and Blue (RGB) color space which is graphically depicted in FIG. 3 and which is an additive color space. In the RGB color space, each "gun" for red, green and blue used in a color monitor is related to a coordinate axis of a cube, i.e. a red gun with a red axis, a green gun with a green axis, and a blue gun with a blue axis. The three coordinates represent the red, green, and blue of the color primaries of the display. As the scalar component values are varied between 0 and 1.0, all of the colors contained in the RGB space can be produced.

Figures 4, 5:
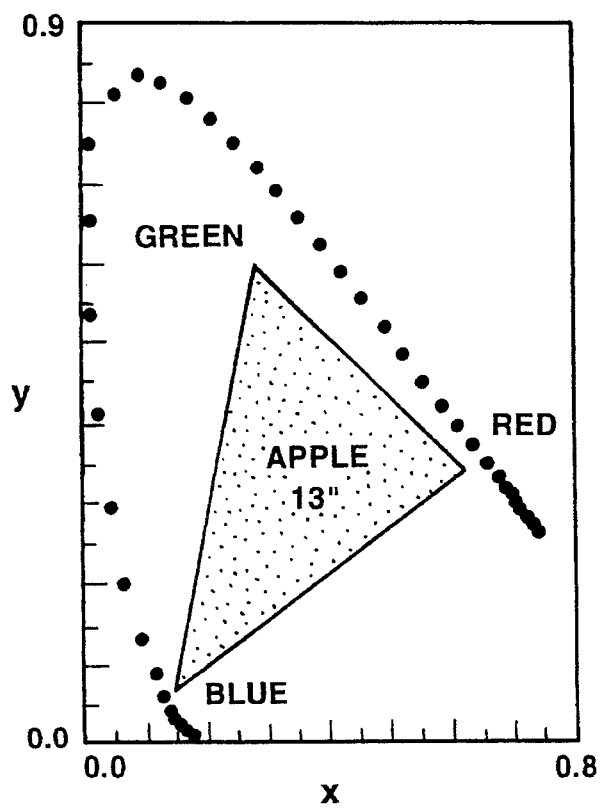
FIG. 4 illustrates an example of a monitor's color gamut in accordance with a preferred embodiment.
FIG. 5 illustrates a Color LookUp Table (CLUT) in accordance with a preferred embodiment.

Each pixel on a color monitor's surface includes a red phosphor, a green phosphor and a blue phosphor. Each phosphor has physical properties which determine the colors which the monitor may produce. The three phosphors and the maximum equal intensity of the electron beam guns determine a color gamut of the monitor. The color gamut defines what colors of the visible spectrum the monitor can produce, as shown in FIG. 4. The horseshoe curve contains all of the visible colors and this graph factors out all of the intensity information in the color gamut and only contains chromaticity information. When a color monitor gamut is plotted in chromaticity space, a triangle as shown in FIG. 4 is produced.

The monitor cannot produce colors outside of the triangle shown in FIG. 4. Thus, the monitor's phosphors determine what subset of visible colors can be reproduced. However, in the monitor's triangle, there are basically an infinite amount of colors that can be made up. However, while the monitor's phosphors theoretically determine which colors the device may physically produce, there are practical limitations on the number of colors each monitor can produce. For example, since computers operate in a digital (as opposed to analog) realm, the number of colors which can be practically produced on a monitor is limited to a finite number. As the number of colors the monitor may produce increases, the memory for storing a digital image of the screen increases. The memory to store the screen is usually contained on a video card.

Due to memory costs, developers have traditionally dynamically set the desired portion of the monitor's color gamut for operation. This approach, illustrated in FIG. 5, uses a Color Look Up Table (CLUT) stored in the memory of the computer or the memory of a display adapter seated in the computer. In the example shown, the application can choose 256 out of 16 million colors. Thus, color production by a monitor is restricted not by the monitor's capabilities to produce colors but rather by the limitations imposed by the video cards in the computer. However, problems (i.e., lack of flexibility) arise in deciding which colors to set in a CLUT given that a limited number of colors may be produced. Another problem is that there may be a number of applications sharing the same CLUT.

Further, enough colors may be provided to cover the monitor's color gamut finely enough so that the CLUT is not needed and so that direct or continuous color is provided. Human visual systems can differentiate about 50,000 different colors. The human visual system color sensitivity is not flat over the horseshoe curve. For a preferred operating system, direct color starts when there are more than 16 bits per pixel. Thus, if at least 16 bits/pixels of color are provided, the RGB color space is finely enough divided and a CLUT is not required. However, the problems discussed above are present in an 8-bit CLUT.

For example, in one conventional operating system, a scheme was developed to handle the sharing of a system CLUT. Color palettes were selectively associated with either a window in an application or the application itself. A palette management system was developed in which colors could be requested by window or by the applications. Depending upon the type of request made, colors could be shared in a friendly or unfriendly fashion. When the active window or application was changed, the palette manager would make the transition between the old active palette and the new palette in a way as visually pleasing as possible to the user.

Figure 6:
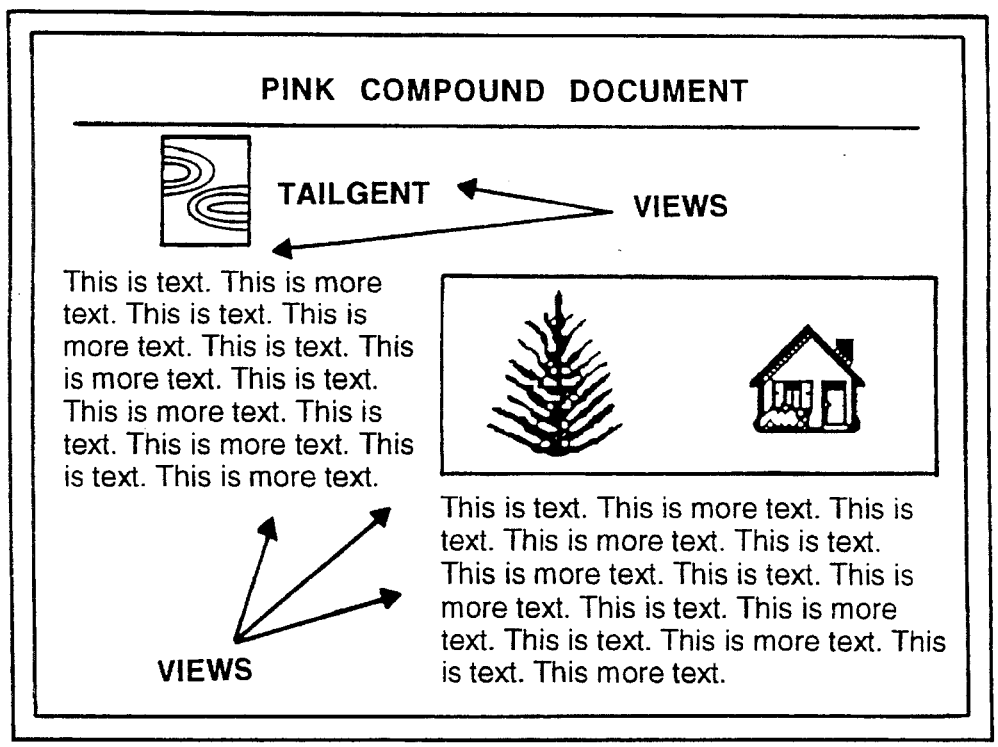
FIG. 6 illustrates a compound document in accordance with a preferred embodiment.

However, while it is relatively easy to associate the CLUT with an application or window in the conventional operating systems, the preferred operating system has problems with such an association. In the preferred operating system, the document framework is drastically different from the conventional operating system. The preferred operating system contains a compound document consisting of a number of small encapsulators (e.g., mini applications) that are "glued" into a larger document. Each encapsulator is in a view, as shown in FIG. 6 and knows what system resources it needs but not what other encapsulators need. As a result, in operating systems which contain a compound document consisting of a number of small encapsulators that are integrated into a document, it is extremely difficult to associate a CLUT with a view. Thus, a different color sharing philosophy must be developed from that used in the conventional systems.

Figure 7:
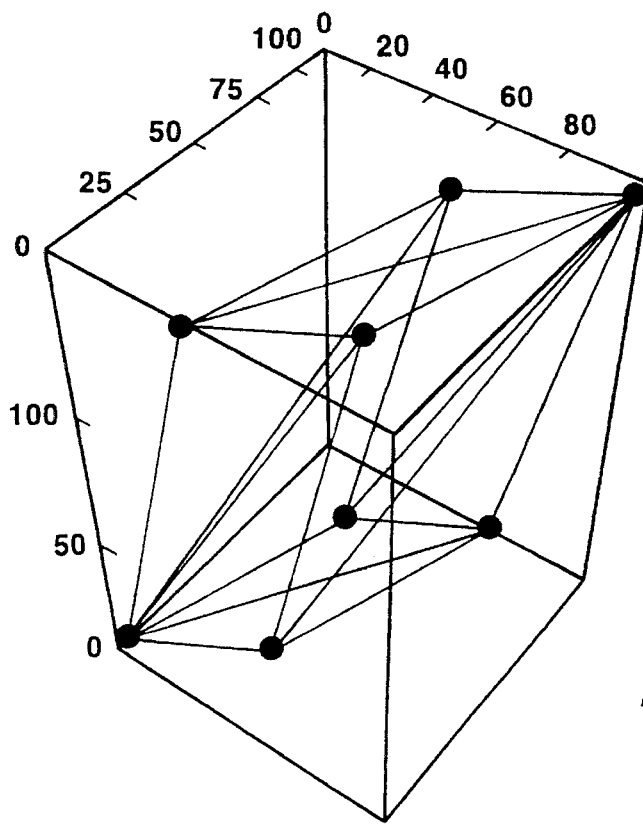
FIG. 7 illustrates a plot of a typical color gamut for a monitor in accordance with a preferred embodiment.
Figure 8:
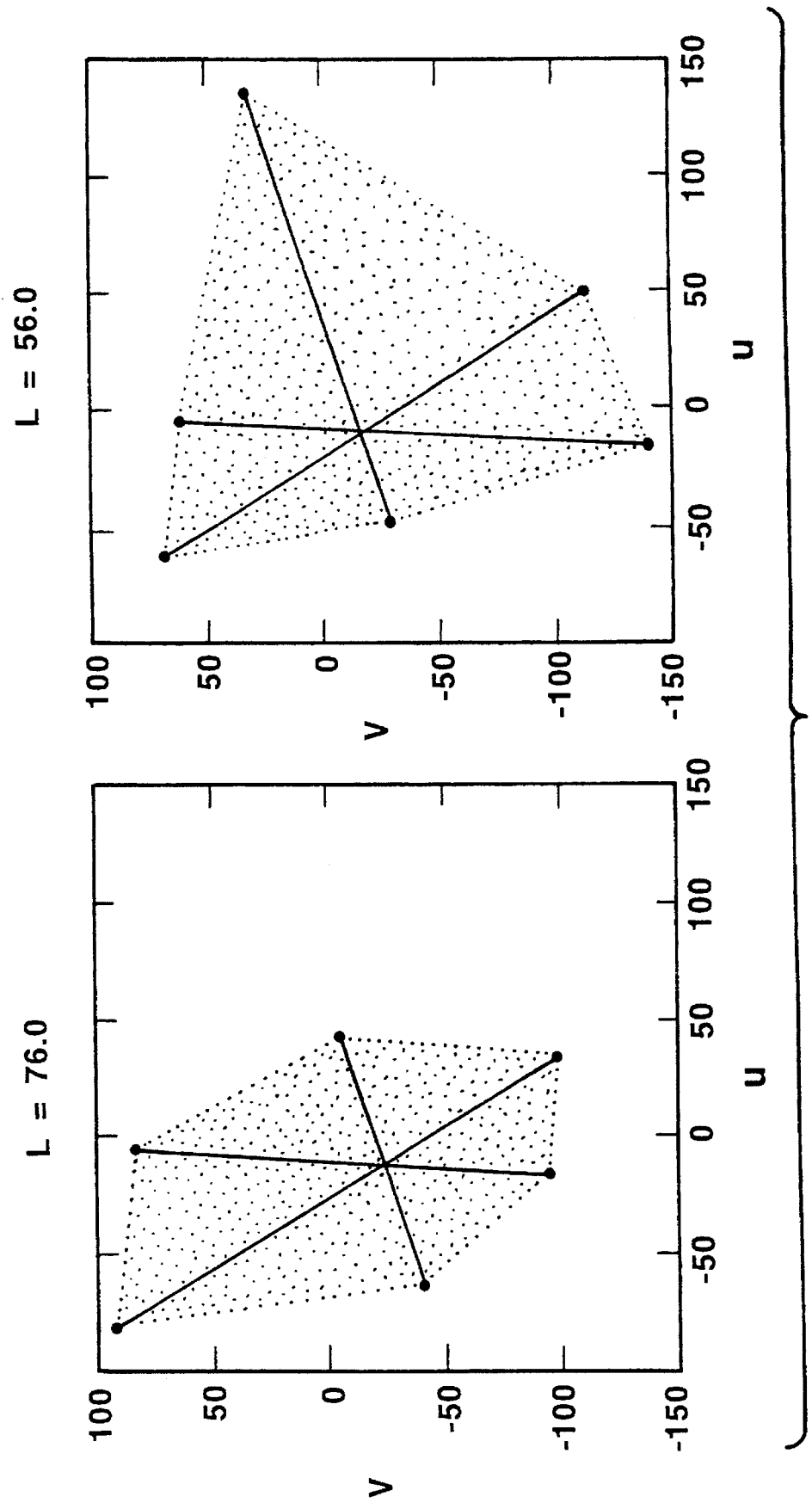
FIG. 8 illustrates a cross-sectional drawing of the gamut plotted in FIG. 7 in accordance with a preferred embodiment.
Figure 11:
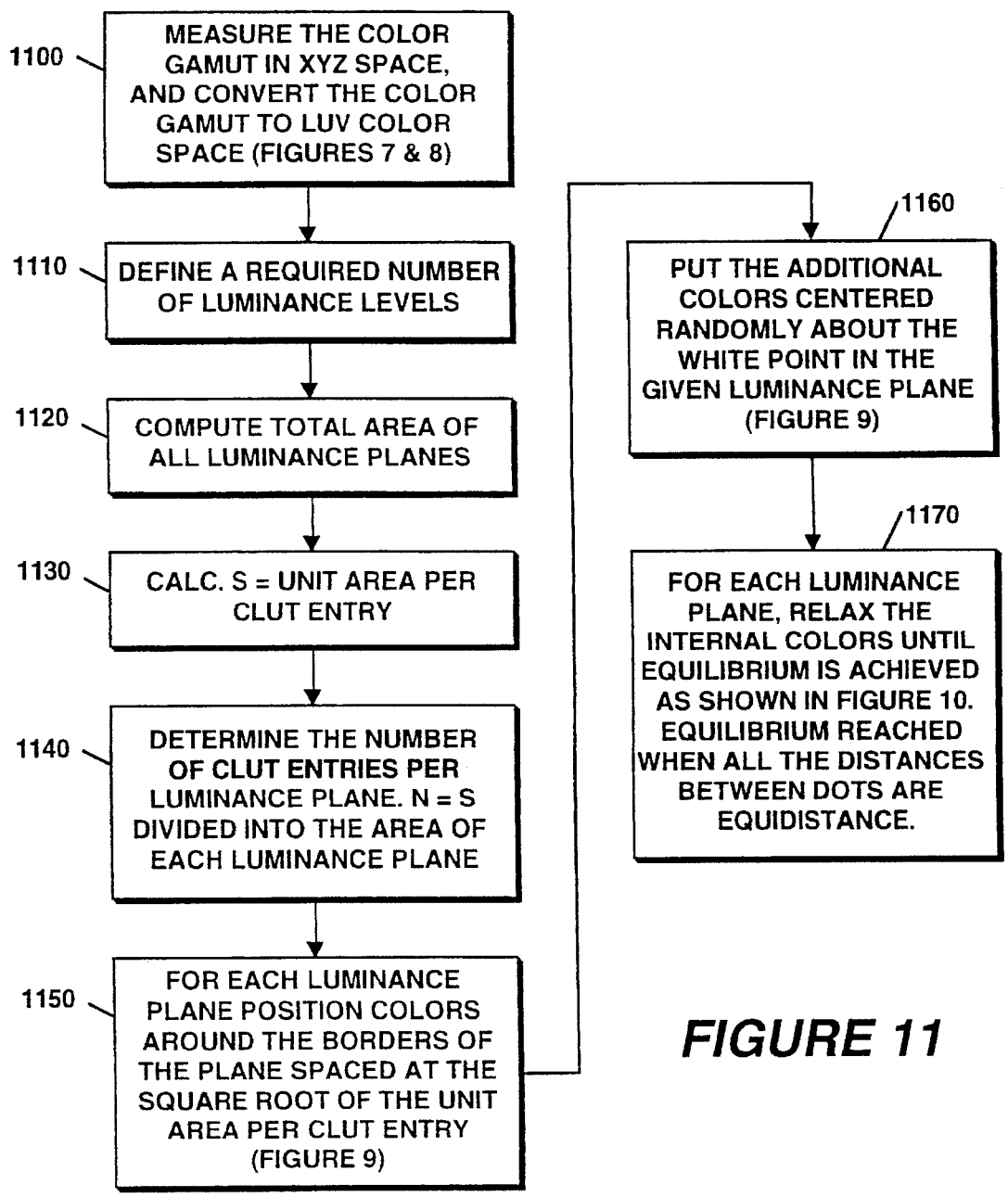
FIG. 11 is a flowchart in accordance with a preferred embodiment.

There are a number of steps which must be performed in order to determine the proper CLUT entry values for a given color monitor as illustrated in FIG. 11. In a preferred embodiment, a color gamut definition is used. For a color monitor the gamut is determined by making eight carefully controlled measurements with an instrument such as spectrophotometer. These measurements are made in XYZ space. The definitions for the eight points on a RGB color monitor are:

Full Off Black
Full on Red
Full on Green
Full on Blue
Full on Yellow
Full on Cyan
Full on Magenta
Full On White A plot of a typical color gamut for a monitor in the XYZ color space is shown in FIG. 7. Once the color gamut is determined in XYZ coordinates, it is necessary to convert it into the LUV color space via a mathematical transformation. The LUV color space is nonlinear mathematically and close to being linear in color perception. The transformation into the LUV color space drastically changes the cubic nature of the color gamut as expressed in the RGB color space, which was shown in FIG. 3. This can be seen by comparing FIG. 8 to FIG. 3. In FIG. 8 slices are made through the gamut plotted in FIG. 7 in the LUV space colors at the indicated values of L.

Figure 9:
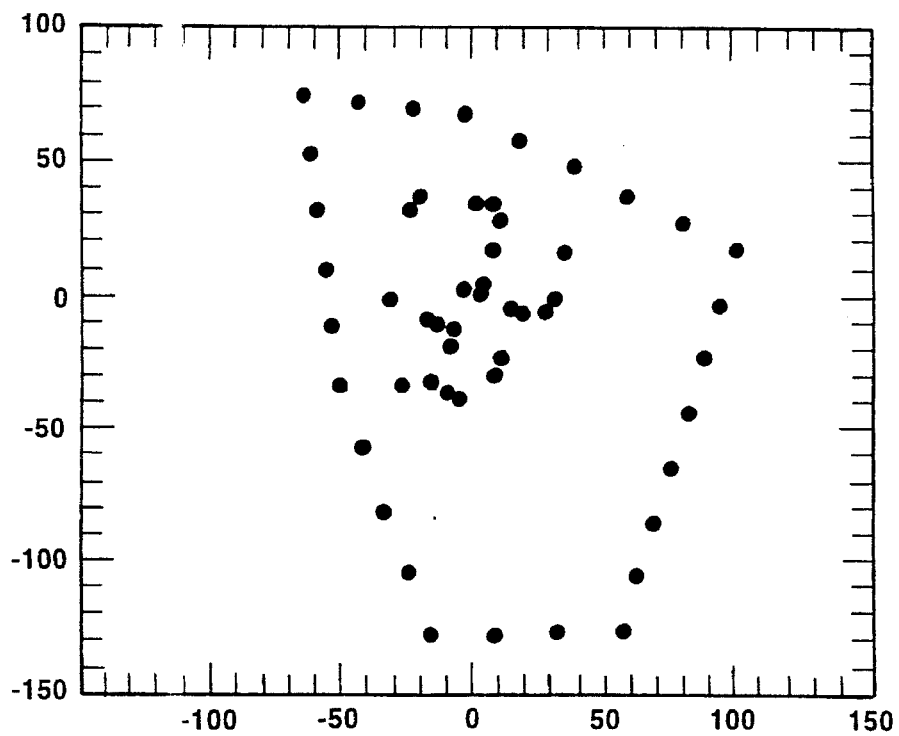
FIG. 9 illustrates colors spaced at the correct positions around the perimeter of the plane and the white point in the plane in accordance with a preferred embodiment.

A planar relaxation technique is used to determine the actual RGB colors in the CLUT. In this technique, slices are made in the color gamut at predetermined values of L. The perpendicular intersection with the L axis of these slices defines a plane of which a typical representation is shown in FIG. 8. The area of each one of the planes is computed. A sum all the planes areas is done to find the total area. The total area of all the planes can then be used to compute the CLUT colors per unit area. This is done by dividing the total area by the number of CLUT entries, usually 256. This value is used to determine the number of CLUTs entries per plane. An example for L=62.5 is shown in FIG. 9, this particular plane required 52 colors or CLUT entries.

Figure 10:
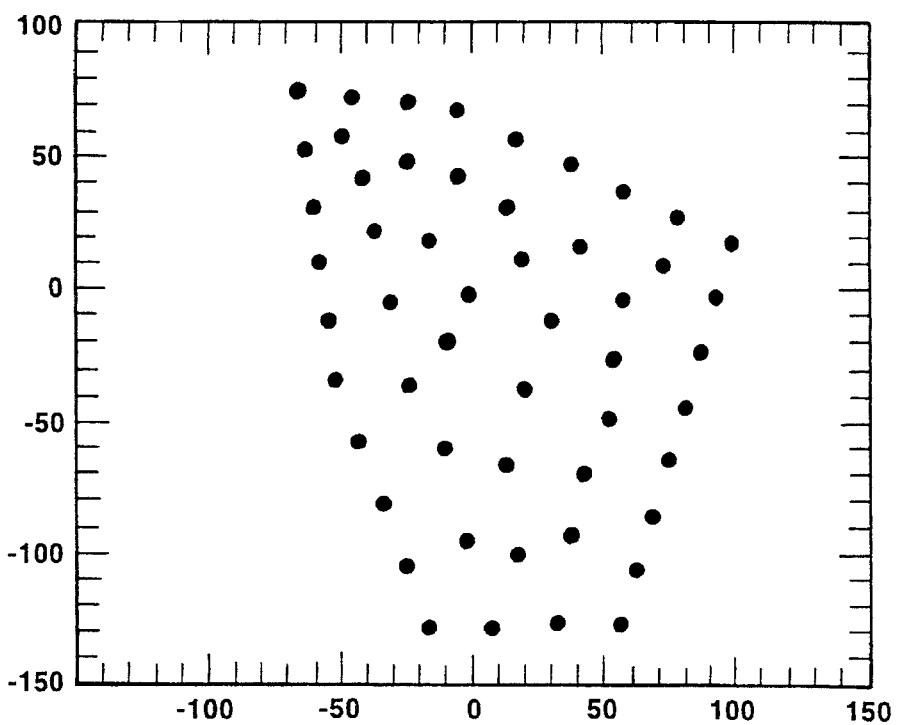
FIG. 10 illustrates the result of a relaxation technique in accordance with a preferred embodiment.

The approach used to actually determine the values is a relaxation technique. The colors are first spaced at the correct positions around the perimeter of the plane and the white point in the plane as illustrated in FIG. 9. The white point in the plane is the point at which a line drawn through white and black points would intersect this plane. Next, the remaining colors are randomly placed around the white point. Each point is then incrementally adjusted to its neighbors by a distance which is inversely proportional to the separation of points around it. This adjustment is repeated to each point until an acceptable error is obtain for all the points. The result of the relaxation technique is shown in FIG. 10 for L=50. This process is repeated for each plane thus generating a complete set CLUT entries. This processing is detailed in FIG. 11. FIG. 11 is a flowchart in accordance with a preferred embodiment. Processing commences at function block 1100 where the color gamut is measured and converted to a LUV color space. This processing corresponds to the illustrations in FIGS. 7 and 8. Then, at function block 1110, the number of luminance levels are defined, the total area of all luminance planes is determined at function block 1120, and a variable S is initialized to the unit area per color lookup table entry at function block 1130. Next, the number of color lookup table entries per luminance plane is determined at function block 1140 by dividing S into the area of each luminance plane. Then, at function block 1150, for each luminance plane, colors are positioned around the borders of the plane. The colors are spaced at a position corresponding to the square root of the unit area per color lookup table entry as shown in FIG. 9. Finally, additional colors are centered randomly as indicated in function block 1160, and for each luminance plane, colors are relaxed to achieve equal disbursement of the pixels as indicated in function block 1170 and illustrated in FIG. 11.

Figures 2, 3:
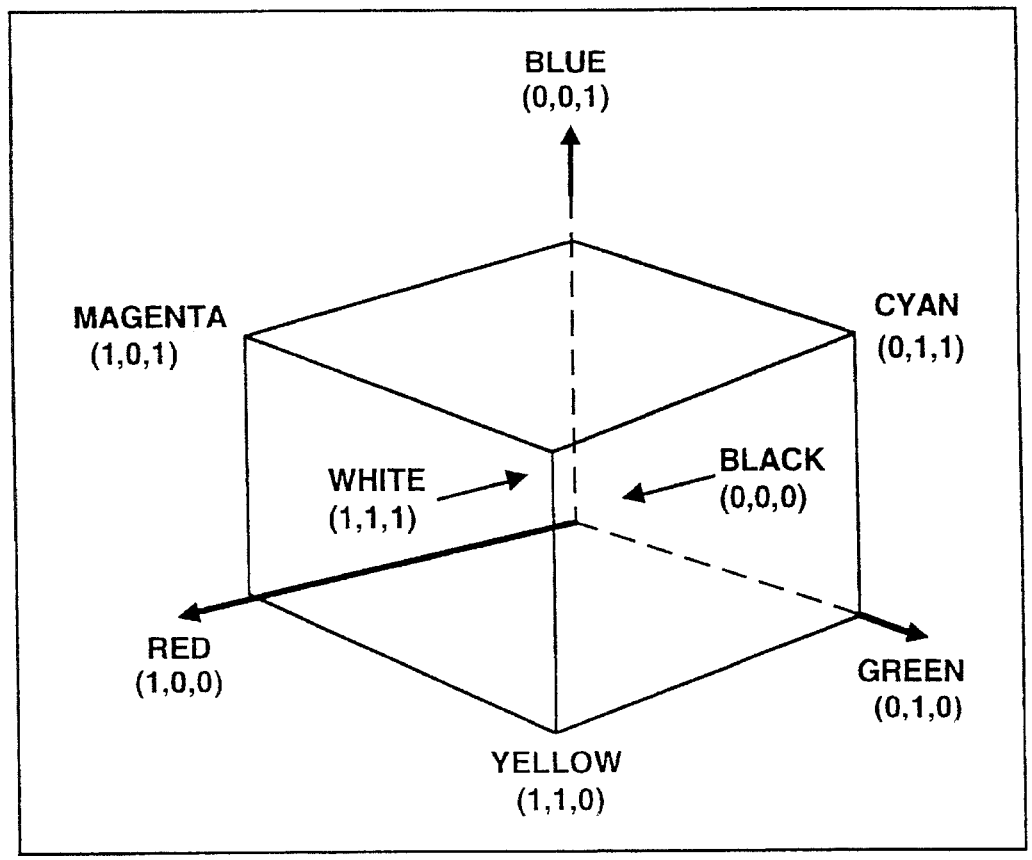
FIG. 2 illustrates the monitor and video card configurations in accordance with a preferred embodiment.
FIG. 3 illustrates a Red, Green and Blue (RGB) color space in accordance with a preferred embodiment.

In a preferred embodiment, as shown in FIG. 2, a number of monitors and video card configurations, are supported. Colors below 8-bits will preferably not be actively supported by the color palette management system according to a preferred embodiment. Above 8-bits, the monitor's color gamuts will preferably be divided up finely enough so that direct (e.g., continuous) color is provided. The 8-bit CLUT, as previously explained, must be shared with all of the views.

Thus, palette management in the preferred operating system is centered around dividing up one system CLUT having a predetermined number of bits such that all views in a document (e.g., a compound document) can share color harmoniously and consistently. According to the invention, since both gray and color configurations must be supported, the invention selects a predetermined number of grays such that there is a smooth transition between grays even when colors are present. Additionally, the selected grays are preferably pure gray. The shades of gray should not be just close to gray since the eye can detect this fairly easily. For example, approximately 24 shades of grays preferably are used (not including 6 which are counted as colors as discussed below).

Thus, the present invention preferably has 232 (e.g., 256–24 =232) colors to work with. For practical reasons (e.g., related to speed of rendering images on a screen), the color gamut should be uniformly divided. For example, if 6 shades of red, 6 shades of green, and 6 shades of blue colors are provided for, this yields 6*6*6 =216 different combinations of color. Of the original 256–24–216 colors, 16 colors are left. The 16 colors remaining are preferably chosen such that they appear consistent across a plurality of graphic devices. Additionally, in the programming environment, these 16 colors preferably should be unique and be referred to by name rather than value. For example, two of the colors preferably match those used in the Taligent trade mark, Teal (Pantone 3125 C) and Purple (2735 C).

One of the hallmarks of the present invention is that it allows some latitude by the developer using the inventive color palette management system. For example, some developers may wish to change the underlying CLUT. The present invention provides for such a feature by creating hooks whereby the developers may create a new graphic device and choose their own set of 256 colors. Such a feature is possible even while running the preferred operating system. Further, with the invention, developers have the ability to change the Gamma table on the color monitor device and such is provided for functionally by the invention.

In sum, the invention provides for color palette management by choosing a versatile general purpose 8-bit CLUT resident on the operating system. Hooks are provided for 2- and 4- bit color CLUTs for the monitors but are not implemented. 2-and 4-bit off-screen CLUTs are fully implemented. 8-bit gray CLUTs will be implemented. Hooks are also provided to change the 8-bit CLUTs but will not be implemented. Gamma table control is implemented and named colors (e.g., 16) are supported. Thus, the color palette management system according to the invention can be customized by the applications developer and is considered a framework within the operating system such that the developer can change the underlying CLUT via the provided hooks to create a new graphic device and choose their own 256 colors.

While the invention has been described in terms of a single preferred embodiment, those skilled in the art will recognize that the invention can be practiced within the spirit and scope of the appended claims.

Having thus described my invention, what I claim as new and desire to secure by Letters Patent is as follows:

1. A method of generating a color look up table for managing multiple color palettes in the memory of a computer with an attached display device, the attached display device having a predetermined color gamut and the memory containing an object oriented operating system, the method compromising the steps of:

(a) selecting a predetermined number of shades of the color gray to be included in the color look up table;

(b) subtracting the predetermined number of gray shades from a maximum number of colors available in the color look up table to determine a number of working colors in the color look up table; dividing the number of working colors in the color gamut of the display device into a predetermined number of different colors, each of the different colors having the same number of shades wherein the predetermined number of different colors corresponds to the largest integer having a cubed value which is less than or equal to the number of working colors;

(d) subtracting a value equal to the cubed value of the predetermined number of different colors from number of working colors in the color look up table to determine a number of remaining colors available in the color look up table; and (e) assigning colors to each of the remaining colors available in the color look up table.

2. A method as recited in claim 1 wherein the maximum number of colors in the look up table corresponds to 256 and the predetermined number of shades of the color gray corresponds to 24.

3. A method as recited in claim 2 wherein the step of dividing the number of working colors in the color gamut of the display device into a predetermined number of different colors includes the step of dividing the number of working colors into three different colors.

4. A method as recited in claim 3, wherein each of the three colors includes six shades of the color.

5. A method as recited in claim 4, wherein the colors are red, green and blue.

6. A method as recited in claim 5, including the steps of:

assigning a digital value to each of the 256 colors in the color look up table; and storing the values with a resolution of 8-bits in the memory of the computer to provide the color look up table.

7. A method as recited in claim 6, including the steps of:

assigning a digital value to each of the 256 colors in the color look up table; and storing the values with a resolution of 16-bits in the memory of the computer to provide the color look up table.

8. A method as recited in claim 1, including the steps of:

assigning a digital value to each of the 256 colors in the color look up table; and storing the values with a resolution of 64-bits in the memory of the computer to provide the color look up table.

9. A method as recited in claim 1, including the steps of:

assigning a digital value to each of the 256 colors in the color look up table; and storing the values with a resolution of 128-bits in the memory of the computer to provide the color look up table.

10. A color look up table for managing a color palette in the memory of a computer with an attached display device the color look up table comprising:

(a) a memory;

(b) a first set of values stored in said memory, said first set of values corresponding to a predetermined number of colors, wherein the predetermined number of colors correspond to a predetermined number of shades of the color gray;

(c) a second set of values stored in said memory, said second set of values corresponding to a number of working colors in the color look up table wherein the number of working colors is provided by subtracting the predetermined number of shades of the color gray from a maximum number of colors available in the color look up table and wherein the number of working colors are divided into a predetermined number of different colors, each of the different colors having the same number of shades wherein the predetermined number of different colors corresponds to the largest integer having a cubed value which is less than or equal to the number of working colors; and (d) a third set of values stored in said memory, said third set of values corresponding to a number of remaining colors available in the color look up table wherein the number of remaining colors is provided by subtracting a value equal to the cubed value of the predetermined number of different colors from the number of working colors in the color look up table.

11. An apparatus as recited in claim 10, wherein the maximum number of colors in the color look up table corresponds to 256 and the predetermined number of shades of the color gray corresponds to 24.

12. An apparatus as recited in claim 11, the number of working colors corresponds to three different colors.

13. An apparatus as recited in claim 12, wherein each of the three different working colors is provided having six shades of color.

14. An apparatus as recited in claim 13, wherein the colors correspond to red, green and blue.

15. An apparatus as recited in claim 14, further comprising means for providing the color look up table with a resolution of 8-bits in said memory.

16. An apparatus as recited in claim 14, further comprising means for providing the color look up table with a resolution of 16-bits in said memory.

17. An apparatus as recited in claim 14, further comprising means for providing the color look up table with a resolution of 64-bits in said memory.

18. An apparatus as recited in claim 14, further comprising means for providing the color look up table with a resolution of 128-bits in said memory.

19. A method of generating a color lookup table entries for a color lookup table having a predetermined total number of entries within a color gamut space of a display device which generates a color output in response to color input signals within a perceptually non-uniform color coordinate space, the method comprising the steps of:

(a) determining the outer boundaries of the color gamut space by physically measuring the color output of the display device and expressing the measured output in a perceptually uniform color coordinate system having a luminance axis;

(b) defining a predetermined number of luminance levels along the luminance axis, each of the luminance levels falling within a luminance plane perpendicular to the luminance axis;

(c) computing a total area of all luminance planes within the color gamut boundaries;

(d) dividing the total gamut area by the predetermined total number of entries to determine a unit area per color point;

(e) determining a number of color points to be placed in each luminance plane by dividing the gamut area of the each luminance plane falling within the color gamut boundaries by the unit area;

(f) for each luminance plane, positioning color points around the borders of the gamut area spaced by a distance equal to the square root of the unit area; and (g) converting the coordinate values of the positioned color points from the perceptually uniform color coordinate space to the perceptually non-uniform color coordinate space to generate the color lookup table entries.

20. The method of claim 19 further comprising the steps of:

(h) for each luminance plane, determining the number of color points remaining after step (f) by subtracting the number of color points positioned around the borders of the gamut area from the number of color points to be placed in the each luminance plane;

(l) positioning the remaining color points randomly around the point where the luminance plane intersects the luminance axis;

(j) moving each of the remaining color points so that all points within the gamut area are substantially equidistant from each other; and (k) converting the remaining color points from the perceptually uniform color space to the perceptually non-uniform color coordinate space to generate additional color lookup table entries.

21. The method of claim 20 wherein step (j) comprises the steps of:

(j1) selecting one of the remaining color points, the selected point having coordinate values in the perceptually uniform color space and a plurality of neighboring points each having coordinate values in the perceptually uniform color space;

(j2) incrementally adjusting the coordinate values of the selected point relative to each of a plurality of the neighboring points by an amount which is inversely proportional to the differences between the coordinate values of the selected point and coordinate values of neighboring points; and (j3) repeating steps (j1) and (j2) for each of the remaining color points until distances between each of the remaining color points are substantially the same.

22. The method of claim 21 further comprising the steps of repeating steps (h)–(k) each of the plurality of luminance planes.

23. The method of claim 22 wherein step (c) comprises the steps of:

(c1) determining a gamut area of each luminance plane lying within the color gamut boundaries; and (c2) summing the luminance plane gamut areas of all luminance planes.

24. The method of claim 23 wherein step (a) comprises the steps of:

(a1) physically measuring the color output of the display device in an XYZ color space to generate XYZ color space values; and (a2) transforming the XYZ color space values to LUV color space values.

25. Apparatus for generating a color lookup table entries for a color lookup table having a predetermined total number of entries within a color gamut space of a display device which generates a color output in response to color input signals within a perceptually non-uniform color coordinate space, the apparatus comprising:

(a) means for determining the outer boundaries of the color gamut space by physically measuring the color output of the display device to generate boundary lines in a perceptually uniform color coordinate system having a luminance axis;

(b) means for defining a predetermined number of luminance levels along the luminance axis, each of the luminance levels falling within a luminance plane perpendicular to luminance axis;

(c) means responsive to the boundary lines for computing a total area of all luminance planes within the color gamut boundaries;

(d) means responsive to total gamut area and the predetermined total number of entries for calculating a unit area per color point by dividing the total gamut area by the predetermined total number of entries;

(e) means responsive to the unit area and the gamut area of the each luminance plane falling within the color gamut boundaries for determining a number of color points to be placed in each luminance plane by dividing the gamut area of the each luminance plane falling within the color gamut boundaries by the unit area;

(f) means operating on the color points in each luminance plane for positioning color points around the borders of the gamut area spaced by a distance equal to the square root of the unit area; and (g) means responsive to the coordinate values of the positioned color points for converting the positioned color point coordinates from the perceptually uniform color coordinate space to perceptually non-uniform color coordinate space to generate the color lookup table entries.

26. The apparatus of claim 25 further comprising:

(h) means operating on the color points in each luminance plane for determining the number of color points remaining after color points are positioned by the positioning means by subtracting the number of color points positioned around the borders of the gamut area from the number of color points to be placed in the each luminance plane;

(i) means for repositioning the remaining color points randomly around the point where the luminance plane intersects the luminance axis;

(j) means for moving each of the remaining color points so that all points within the gamut area are substantially equidistant from each other; and (k) means for converting the remaining color points from the perceptually uniform color space to the perceptually non-uniform color coordinate space to generate additional color lookup table entries.

27. The apparatus of claim 26 wherein the moving means comprises:

(j1) means for selecting one of the remaining color points, the selected point having coordinate values in the perceptually uniform color space and a plurality of neighboring points each having coordinate values in the perceptually uniform color space;

(j2) means for incrementally adjusting the coordinate values of the selected point relative to each of a plurality of the neighboring points by an amount which is inversely proportional to the differences between the coordinate values of the selected point and coordinate values of neighboring points; and (j3) means for repeating steps (j1) and (j2) for each of the remaining color points until distances between each of the remaining color points are substantially the same.

28. The apparatus of claim 27 further comprising means for processing each of the plurality of luminance planes to determine the color points thereon.

29. The apparatus of claim 28 wherein the total gamut area determining means comprises means for determining a gamut area of each luminance plane lying within the color gamut boundaries and means for summing the luminance plane gamut areas of all luminance planes.

30. The apparatus of claim 29 wherein the outer boundary determining means comprises means for physically measuring the color output of the display device in an XYZ color space to generate XYZ color space values and means responsive to the XYZ color space values for transforming the XYZ color space values to LUV color space values.

* * * * *